(12) United States Patent
Kim et al.

(10) Patent No.: US 10,276,270 B2
(45) Date of Patent: Apr. 30, 2019

(54) NUCLEAR REACTOR COOLANT PUMP AND NUCLEAR POWER PLANT HAVING SAME

(71) Applicant: KOREA ATOMIC ENERGY RESEARCH INSTITUTE, Daejeon (KR)

(72) Inventors: Young Soo Kim, Seoul (KR); Young In Kim, Daejeon (KR); Cheon Tae Park, Daejeon (KR); Ju Hyeon Yoon, Daejeon (KR); Tae Wan Kim, Daejeon (KR); Keung Koo Kim, Daejeon (KR); Jae Joo Ha, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 185 days.

(21) Appl. No.: 15/030,578

(22) PCT Filed: Nov. 25, 2014

(86) PCT No.: PCT/KR2014/011357
§ 371 (c)(1),
(2) Date: Apr. 19, 2016

(87) PCT Pub. No.: WO2015/080447
PCT Pub. Date: Jun. 4, 2015

(65) Prior Publication Data
US 2016/0260509 A1 Sep. 8, 2016

(30) Foreign Application Priority Data

Nov. 28, 2013 (KR) .......................... 10-2013-0146527

(51) Int. Cl.
*G21D 3/10* (2006.01)
*G21C 17/00* (2006.01)
(Continued)

(52) U.S. Cl.
CPC ............. *G21C 15/24* (2013.01); *G21C 1/322* (2013.01); *G21C 1/328* (2013.01); *G21C 15/182* (2013.01);
(Continued)

(58) Field of Classification Search
CPC .... G21C 15/24; G21C 15/243; G21C 15/247; G21C 15/28; G21C 1/322; G21C 1/324; G21C 1/326
(Continued)

(56) References Cited

U.S. PATENT DOCUMENTS 3,255,088 A * 6/1966 Ammon ..................... F22B 1/08
376/203
3,296,083 A * 1/1967 Haake ....................... G21C 1/08
376/287
(Continued)

FOREIGN PATENT DOCUMENTS

JP 2013-029316 2/2013
JP 2013-072409 4/2013

OTHER PUBLICATIONS

English Maching Translation of Eiichi et al., JP 2013-072409, published Apr. 22, 2013.*
(Continued)

*Primary Examiner* — Jack W Keith
*Assistant Examiner* — Sandra Herrick
(74) *Attorney, Agent, or Firm* — Scully Scott Murphy and Presser (57) ABSTRACT

The present invention discloses a nuclear reactor coolant pump that does not rely on an electric motor, but is operated by means of driving force generated inside a nuclear power plant, so a to be capable of maintaining the safety of the nuclear reactor when the nuclear reactor is operating normally and also in the event of an accident in the nuclear
(Continued)

reactor. The nuclear reactor coolant pump comprises: a pump impeller rotatably installed in a first fluid passage of a nuclear reactor coolant system to circulate a first fluid inside the nuclear reactor coolant system; a drive unit receiving steam from a steam generator to generate driving force to rotate the pump impeller, and rotating about the same rotating shaft as the pump impeller to transfer the generated driving force to the pump impeller; and a steam supplying unit forming a passage between the steam generator and the drive unit to supply at least a portion of the steam released from the steam generator to the drive unit.

12 Claims, 10 Drawing Sheets (51) Int. Cl.
| | | |
|---|---|---|
| G21C 17/01 | (2006.01) | |
| G21C 17/02 | (2006.01) | |
| G21C 17/06 | (2006.01) | |
| G21C 19/20 | (2006.01) | |
| G21C 17/003 | (2006.01) | |
| G21C 17/007 | (2006.01) | |
| G21C 17/013 | (2006.01) | |
| G21C 17/022 | (2006.01) | |
| G21C 17/104 | (2006.01) | |
| G21C 17/108 | (2006.01) | |
| G21C 17/112 | (2006.01) | |
| G21C 19/07 | (2006.01) | |
| G21C 19/40 | (2006.01) | |
| G21C 19/34 | (2006.01) | |
| G21C 15/24 | (2006.01) | |
| G21C 1/32 | (2006.01) | |
| G21C 15/243 | (2006.01) | |
| G21C 15/18 | (2006.01) | |
| G21D 1/04 | (2006.01) | |
| G21C 15/247 | (2006.01) | |
| G21C 15/28 | (2006.01) | |

(52) U.S. Cl.
CPC ............ *G21C 15/243* (2013.01); *G21D 1/04* (2013.01); *G21C 1/324* (2013.01); *G21C 1/326* (2013.01); *G21C 15/247* (2013.01); *G21C 15/28* (2013.01); *G21C 2015/185* (2013.01); *G21Y 2002/50* (2013.01); *G21Y 2004/30* (2013.01); *Y02E 30/40* (2013.01)

(58) Field of Classification Search
USPC ................. 376/420, 404, 405, 406
See application file for complete search history.

(56) References Cited

U.S. PATENT DOCUMENTS

| | | | | |
|---|---|---|---|---|
| 3,422,766 | A * | 1/1969 | Conibeer | F04D 7/065 376/285 |
| 4,038,134 | A | 7/1977 | Dorner et al. | |
| 4,045,286 | A * | 8/1977 | Blum | G21C 1/03 376/288 |
| 4,487,742 | A * | 12/1984 | Bret | F28D 15/0275 165/911 |
| 4,765,948 | A * | 8/1988 | DeLuca | G21C 15/247 310/11 |
| 4,859,402 | A * | 8/1989 | Tupper | G21C 1/03 376/285 |
| 4,886,430 | A * | 12/1989 | Veronesi | F04D 13/02 310/74 |
| 5,017,102 | A * | 5/1991 | Shimaguchi | G21C 15/243 376/402 |
| 5,073,335 | A * | 12/1991 | Townsend | F04D 7/08 376/373 |
| 5,112,569 | A * | 5/1992 | Cinotti | G21C 1/322 376/282 |
| 5,124,115 | A * | 6/1992 | Dillmann | F04D 7/08 376/372 |
| 5,135,711 | A * | 8/1992 | Borchardt | G21C 15/18 376/372 |
| 7,147,427 | B1 * | 12/2006 | Campbell | F01D 11/04 415/1 |
| 8,331,523 | B2 * | 12/2012 | Nishiguchi | G21C 1/02 376/361 |
| 9,721,681 | B2 * | 8/2017 | Shargots | G21C 13/02 |
| 9,947,421 | B2 * | 4/2018 | Toshinsky | G21C 1/03 |
| 2005/0018806 | A1 * | 1/2005 | Gautier | G21C 1/32 376/406 |
| 2007/0201602 | A1 * | 8/2007 | Isono | G21C 1/084 376/298 |
| 2012/0076254 | A1 * | 3/2012 | Malloy | G21C 1/086 376/220 |
| 2012/0275558 | A1 * | 11/2012 | Cinotti | F22B 1/162 376/406 |
| 2013/0301787 | A1 * | 11/2013 | Fortino | G21C 15/25 376/392 |
| 2013/0301788 | A1 * | 11/2013 | Fortino | G21C 15/25 376/392 |
| 2013/0301789 | A1 * | 11/2013 | Fortino | G21C 15/25 376/392 |
| 2013/0301790 | A1 * | 11/2013 | Fortino | G21C 15/25 376/392 |
| 2014/0140467 | A1 * | 5/2014 | Fortino | G21C 1/086 376/395 |
| 2015/0357061 | A1 * | 12/2015 | Ales | F16F 15/30 376/282 |

OTHER PUBLICATIONS

International Search Report and Written Opinion for PCT/KR2014/011357, dated Mar. 20, 2015, 8 pages.

* cited by examiner

NUCLEAR REACTOR COOLANT PUMP AND NUCLEAR POWER PLANT HAVING SAME

CROSS-REFERENCE TO RELATED APPLICATIONS

This application is the national phase of PCT application PCT/KR2014/011357 having an international filing date of 25 Nov. 2014, which claims the benefit of earlier filing date and right of priority to Korean Application No. 10-2013-0146527, filed on 28 Nov. 2013, the contents of which are incorporated by reference herein in their entirety.

TECHNICAL FIELD

The present invention relates to a reactor coolant pump driven by steam generated from a steam generator, and a nuclear power plant having the same.

BACKGROUND ART

A nuclear reactor is categorized into a loop type reactor where main components (a steam generator, a pressurizer, a pump impeller, etc.) are installed outside a reactor vessel (e.g., a commercial reactor: Korea), and an integral reactor where main components are installed inside a reactor vessel (e.g., SMART: Korea) according to an installation position of the main components.

Further, the nuclear reactor is categorized into an active reactor (e.g., a commercial reactor: Korea) and a passive reactor (e.g., AP1000: USA) according to an implementation method of a safety system. The active reactor means a reactor using an active device such as a pump which is operated by power generated from an emergency diesel generator, etc. in order to operate a safety system. And the passive reactor means a reactor using a passive device which is operated by a passive power such as a gravitational force or a gas pressure, in order to operate a safety system.

A reactor coolant pump for circulating a fluid inside a reactor coolant system is installed at a nuclear reactor. However, since the conventional reactor coolant pump uses an electric motor, and electric power for driving the electric motor is required. In a nuclear power plant, electric power is generated by a turbine and an electric generator. In this case, a large energy loss (about 60%) occurs while electricity is generated. Further, since an electric motor is used, an installation space of the electric motor is required, a sealing facility for preventing current leakage should be maintained, and equipment for cooling heat generated from the electric motor is required. This may cause the reactor coolant pump to be designed and fabricated with a difficulty, and may cause increased costs, etc.

Thus, a reactor coolant pump capable of overcoming problems of the conventional reactor coolant pump using an electric motor, may be considered.

DISCLOSURE OF THE INVENTION

Therefore, an object of the present invention is to provide a reactor coolant pump driven without an electric motor, and a nuclear power plant having the same.

Another object of the present invention is to provide a reactor coolant pump driven for a considerable time during which accident attenuation should be performed by steam, and a nuclear power plant having the same.

Another object of the present invention is to provide a reactor coolant pump capable of enhancing safety of a nuclear reactor, and a nuclear power plant having the same.

To achieve these and other advantages and in accordance with the purpose of the present invention, as embodied and broadly described herein, there is provided a reactor coolant pump, including: a reactor coolant pump, including: a pump impeller rotatably installed at a primary fluid flow path of a reactor coolant system, in order to circulate the primary fluid in the reactor coolant system; a driving unit rotated about the same rotating shaft as the pump impeller by receiving steam from a steam generator so as to generate a driving force for rotating the pump impeller, and configured to transmit the generated driving force to the pump impeller; and a steam supplying unit configured to form a flow path between the steam generator and the driving unit, so as to supply at least part of steam discharged from the steam generator to the driving unit.

In an embodiment of the present invention, the driving unit may include: a driving turbine rotated about the same rotating shaft as the pump impeller by receiving steam from the steam supplying unit so as to convert a fluid force of steam into a mechanical rotation force; and a power transmitting unit installed between the driving turbine and the pump impeller, so as to transmit the mechanical rotation force formed by the driving turbine to the pump impeller.

The reactor coolant pump may further include a casing formed to enclose the driving turbine, such that the primary fluid which circulates in the reactor coolant system may be isolated from a secondary fluid which passes through the steam generator.

The power transmitting unit may include: a driving magnet portion connected to the rotating shaft of the driving turbine, so as to be rotated together with the driving turbine in the casing when the driving turbine is rotated; and a driven magnet portion installed outside the casing so as to face the driving magnet portion, connected to the rotating shaft of the pump impeller, coupled with the driving magnet portion by a magnetic force in order to transfer the mechanical rotation force formed by the driving turbine to the pump impeller, and rotated together with the driving magnet portion when the driving magnet portion is rotated.

One of the driving magnet portion and the driven magnet portion may be formed such that at least part thereof may enclose an edge of another one of the driving magnet portion and the driven magnet portion.

The power transmitting unit may include a pump shaft connected to each of the pump impeller and the driving turbine as at least part thereof passes through the casing, so as to form the rotating shaft of the pump impeller and the driving turbine.

The pump shaft may include: a first pump shaft connected to one of the pump impeller and the driving turbine, and having at least part passing through the casing; and a second pump shaft connected to another one of the pump impeller and the driving turbine, and connected to the first pump shaft so as to be rotated together with the first pump shaft.

The power transmitting unit may further include a sealing device configured to prevent leakage of the primary fluid or the secondary fluid, and installed at a region where the pump shaft passes through the casing.

The reactor coolant pump may further include a flywheel installed at the pump shaft in order to relieve a drastic performance change of the driving turbine or the pump impeller, and in order to provide a circulation flow to the reactor coolant system when a nuclear reactor is stopped.

The reactor coolant pump may further include a steam collecting unit configured to form a flow path communicated with the casing and connected to the main steam line, so as to collect steam having passed through the driving unit and to supply the collected steam to a turbine system.

The steam supplying unit and the steam collecting unit may be connected to a header of the steam generator, and a bypass flow path along which excess steam remaining after being supplied to the driving unit is transferred to the main steam line, may be installed at the header of the steam generator.

The steam collecting unit may extend to the outside of the reactor coolant system by passing through the reactor coolant system. And the reactor coolant pump may further include: a steam collecting line configured to connect the steam collecting unit with the main steam line, such that steam is introduced into the main steam line from the steam collecting unit; and a flow control valve installed at the steam collecting line, and configured to control a flow of steam which passes through the driving unit.

The reactor coolant pump may further include a bypass flow control valve installed at the main steam line, and configured to control a flow of the excess steam which passes through the bypass flow path.

To achieve these and other advantages and in accordance with the purpose of the present invention, as embodied and broadly described herein, there is also provided a nuclear power plant, including: a steam generator configured to generate steam by transferring heat supplied from a reactor core, to a secondary fluid introduced through a feed water line; and a reactor coolant pump configured to circulate a primary fluid inside a reactor coolant system, using a driving force generated by using at least part of steam generated by the steam generator, wherein the reactor coolant pump includes: a pump impeller rotatably installed at a primary fluid flow path of the reactor coolant system, in order to circulate the primary fluid in the reactor coolant system; a driving unit rotated about the same rotating shaft as the pump impeller by receiving steam from the steam generator so as to generate a driving force for rotating the pump impeller, and configured to transmit the generated driving force to the pump impeller; and a steam supplying unit configured to form a flow path between the steam generator and the driving unit, so as to supply at least part of steam discharged from the steam generator to the driving unit

ADVANTAGEOUS EFFECTS

The present invention may have the following advantages.

Firstly, owing to the small driving turbine installed to generate force using steam generated from the steam generator, the reactor coolant pump can be driven by a driving force generated from the driving turbine, without an electric motor. And energy loss occurring while electricity is generated can be reduced.

Especially, in a case where the reactor coolant pump is applied to an integral reactor, the reactor coolant pump can be installed in the reactor coolant system (the reactor vessel). As a result, the reactor coolant pump can be easily applied even to a high temperature and a high pressure as a motor is removed, and the reactor coolant pump can have a compact and simplified structure. Further, since a sealing facility for preventing current leakage of the motor is not required and equipment for cooling heat generated from the motor is not required, the reactor coolant pump can have a simple design and it brings the convenience of maintenance.

Further, steam supplied from the steam generator can be used to generate a driving force for driving the reactor coolant pump, and can be re-collected. This can minimize energy loss.

Further, the reactor coolant pump can be continuously driven, by steam generated from the steam generator, for a considerable time required for an accident mitigation in an accident, until when steam cannot be generated as the reactor coolant system reaches a low temperature. This can enhance a natural circulating function of a nuclear power plant, and can cooldown a nuclear reactor safely, resulting in enhancing safety of the nuclear reactor.

MODES FOR CARRYING OUT THE PREFERRED EMBODIMENTS

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a reactor coolant pump and a nuclear power plant having the same according to an embodiment, with reference to the accompanying drawings.

In this specification, the same or equivalent components will be provided with the same reference numbers, and description thereof will not be repeated. A singular expression in the specification includes a plural meaning unless it is contextually definitely represented.

In the following descriptions, the reactor coolant pump and the nuclear power plant having the same of the present invention are applied to an integral reactor. However, the present invention is not limited to this. That is, the reactor coolant pump and the nuclear power plant having the same of the present invention may be also applicable to a loop type reactor.

Figure 1:
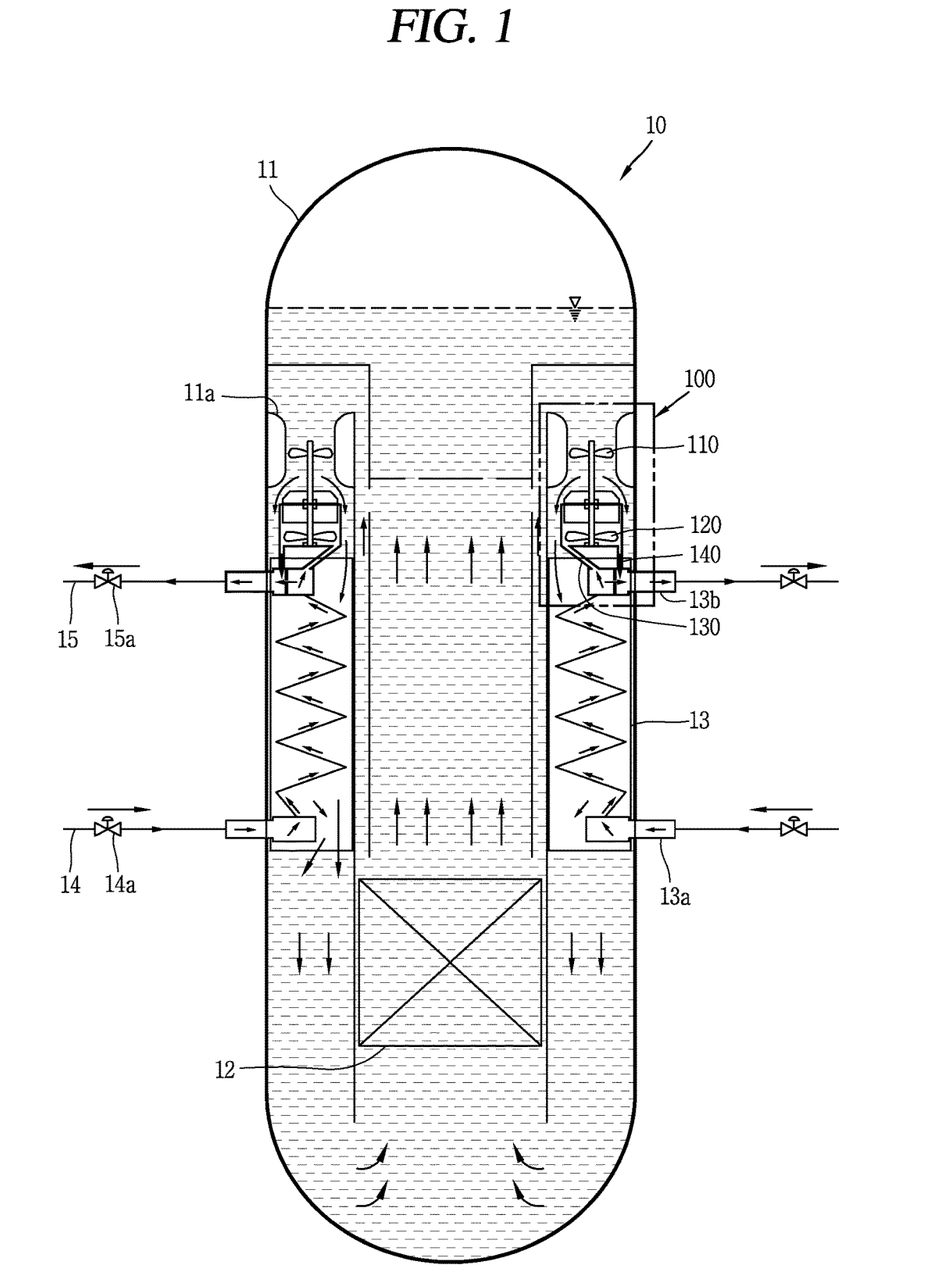
FIG. 1 is a conceptual view of a reactor coolant pump and a nuclear power plant having the same according to an embodiment of the present invention.

FIG. 1 is a conceptual view of a reactor coolant pump 100 and a nuclear power plant having the same according to an embodiment of the present invention.

A reactor coolant system 10 serves to receive thermal energy generated from a reactor core 12 by nuclear fission, and to transmit the thermal energy to a secondary system through a steam generator 13. In an integral reactor, the reactor coolant system 10 includes a reactor vessel (a reactor pressure vessel) 11 and equipment installed in the reactor vessel 11. A primary fluid(coolant) for cooling nuclear fuel is filled in the reactor vessel 11. And the steam generator 13 for converting feed water of a secondary system into steam by receiving thermal energy from the reactor core 12, is installed in the reactor vessel 11.

The steam generator 13 receives heat from the reactor core 12, and generates steam by receiving feed water of a secondary system (a secondary fluid) supplied from a main feed water line 14 connected to an inlet header 13a installed therebelow. Feed water is converted into steam in the steam generator 13, and then is transferred to a turbine system (not shown) through a main steam line 15.

The reactor coolant system 10 forms a pressure boundary between a primary fluid accommodated in the reactor vessel 11 and a secondary fluid which passes through the steam generator 13, thereby separating the primary fluid and the secondary fluid from each other. And the reactor coolant system 10 prevents radioactive materials from leaking to the outside.

The reactor coolant pump 100 cools nuclear fuel by circulating the primary fluid contained in the reactor coolant system 10. The high-temperature primary fluid, which has received heat from the reactor core 12 while cooling the reactor core 12, is moved upward. And the reactor coolant pump 100 downward-circulates the primary fluid.

The reactor coolant pump 100 of the present invention is driven by steam generated from the steam generator 13, not by an electric motor. In case of an integral reactor, as shown in FIG. 1, the reactor coolant pump 100 may be installed in the reactor coolant system 10. The reactor coolant pump 100 includes a pump impeller 110, a driving unit 120, a steam supplying unit 130, and a steam collecting unit 140.

The pump impeller 110 is installed in the reactor coolant system 10, so as to circulate the primary fluid in the reactor coolant system 10 by rotation. As shown in FIG. 1, the pump impeller 110 may be installed on a primary fluid flow path in the reactor vessel 11. In case of a loop type reactor, the pump impeller 110 may be installed on a circulation line of a reactor coolant system.

A flow path structure 11a, protruding from an inner wall of the reactor coolant system 10, is installed on a circumference of the pump impeller 110. The flow path structure 11a forms a primary fluid flow path, such that a primary fluid in the reactor coolant system 10 is uniformly introduced along the flow path, and such that a proper gap is formed between the pump impellor 10 and the flow path to maintain performance of the reactor coolant pump 100.

The driving unit 120 generates a driving force for rotating the pump impeller 110. The driving unit 120 receives steam from the steam generator 13, thereby being rotated about its rotating shaft 121' having the same direction as a rotating shaft 110' of the pump impeller 110. And the driving unit 120 transmits a driving force generated by rotation to the pump impeller 110.

The steam supplying unit 130 forms a flow path between the steam generator 13 and the driving unit 120, such that at least part of steam generated from the steam generator 13 is supplied to the driving unit 120. The steam collecting unit 140 is configured to collect steam having passed through the driving unit 120, and to supply the collected steam to the main steam line 15 installed between the steam generator 13 and a turbine system (not shown). The collected steam is supplied to the turbine system through the main steam line 15. The steam supplying unit 130 and the steam collecting unit 140 may be diverged from an outlet header 13b of the steam generator 13.

Steam generated from the steam generator 13 is supplied to the driving unit 120 through the steam supplying unit 130, and the driving unit 120 converts a fluid force into a mechanical rotation force. A driving force generated by a mechanical rotation force is transferred to the pump impeller 110, and consequentially the pump impeller 110 is rotated by steam generated from the steam generator 13. The pump impeller 110 converts a mechanical rotation force received from the driving unit 120 into a fluid force, thereby circulating the primary fluid in the reactor coolant system 10.

Steam is re-collected to be supplied to the main steam line 15. Since the reactor coolant pump 100 may be driven without an electric motor and steam can be re-collected, energy loss occurring while the reactor coolant pump 100 is driven can be minimized.

A detailed structure of the reactor coolant pump 100 will be explained with reference to FIG. 2.

Figure 2:
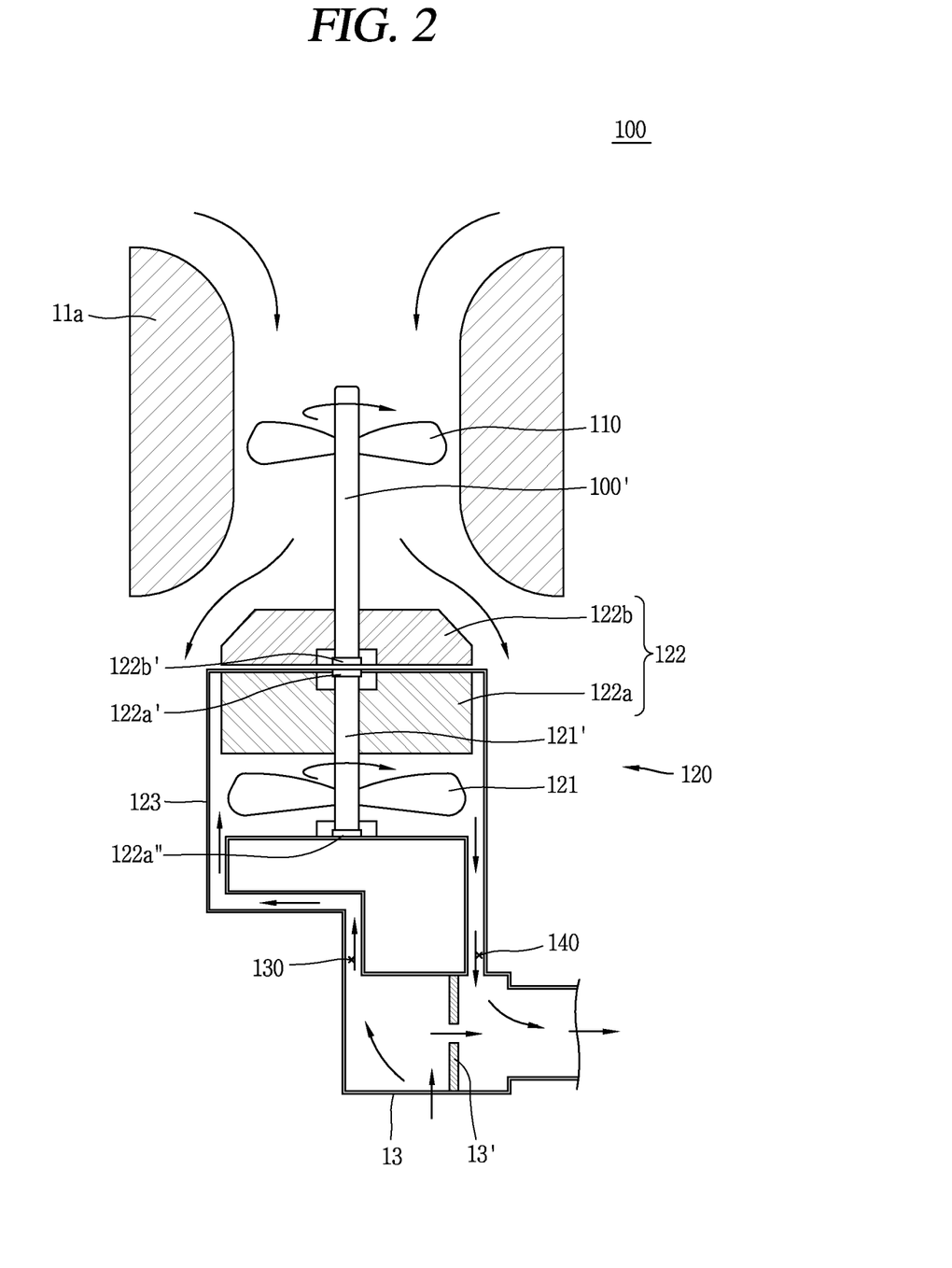
FIG. 2 is an enlarged view of the reactor coolant pump of FIG. 1.

FIG. 2 is an enlarged view of the reactor coolant pump 100 shown in FIG. 1.

The pump impeller 110 is formed to be rotatable about a rotating shaft. As the pump impeller 110 is rotated, a primary fluid in the reactor coolant system 10 flows from the upper side to the lower side.

The driving unit 120 includes a driving turbine 121 for generating a driving force to rotate the pump impeller 110, and a power transmitting unit 122 for transmitting a driving force generated from the driving turbine 121 to the pump impeller 110.

A casing 123 separates a primary fluid which circulates in the reactor coolant system 10, from a secondary fluid which passes through the steam generator 13. The casing 123 is formed to be connected to the steam supplying unit 130, and at least part of the casing 123 encloses the driving turbine 121. The casing 123 maintains a pressure boundary between the primary fluid and the secondary fluid.

The casing 123 is connected to the outlet header 13b of the steam generator 13. Steam is supplied into the casing 123 from the outlet header 13b of the steam generator 13, through the steam supplying unit 130. Steam having passed through the driving unit 120 is discharged to the outlet header 13b of the steam generator 13, through the steam collecting unit 140. The steam discharged to the outlet header 13b of the steam generator 13 through the steam collecting unit 140, is supplied to the main steam line 15 (refer to FIG. 1).

The driving turbine 121 is rotated about a rotating shaft having the same direction as the pump impeller 110, by receiving steam generated from the steam generator 13 through the steam supplying unit 130 in order to convert a fluid force of the steam into a mechanical rotation force.

The power transmitting unit 122 is installed between the driving turbine 121 and the pump impeller 110, in order to transfer a mechanical rotation force generated from the driving turbine 121 to the pump impeller 110. A mechanism to transfer a mechanical rotation force to the pump impeller 110 by the power transmitting unit 122 may be variable. The present invention provides two methods. The first method is a magnet method by coupling between two permanent magnets, and the second method is a method for sealing a pump shaft by a mechanical sealing device. A method shown in FIG. 2 is the magnet method.

The power transmitting unit 122 of the magnet method includes a driving magnet portion 122a and a driven magnet portion 122b.

The driving magnet portion 122a is connected to the rotating shaft of the driving turbine 121, so as to be rotated together with the driving turbine 121 in the casing 123 when the driving turbine 121 is rotated. The driven magnet portion 122b is installed outside the casing 123 so as to face the driving magnet portion 122a, and is connected to the rotating shaft of the pump impeller 110. The driven magnet portion 122b is coupled with the driving magnet portion 122a by a magnetic force, in order to receive a mechanical rotation force formed by the driving turbine 121 and to transfer the received mechanical rotation force to the pump impeller 110.

Once the driving magnet portion 122a is rotated, the driven magnet portion 122b is together rotated to transfer a mechanical rotation force to the pump impeller 110. As a result, the pump impeller 110 is rotated by a driving force generated by using steam supplied from the steam generator 13.

Since the driving magnet portion 122a and the driven magnetic portion 122b are rotated by coupling due to a magnetic force, the driving magnet portion 122a and the driven magnetic portion 122b may be installed inside and outside the casing 123 in a spaced manner from each other. Since the casing 123 maintains a sealed state of the driving unit 120, a pressure boundary between a primary fluid and a secondary fluid is not damaged during the driving force transmission.

Bearings 122a', 122a", 122b' for a lubricating operation are installed at the rotating shaft 110' of the pump impeller 110 and the rotating shaft 121' of the driving turbine 121. The bearings 122a', 122a", 122b' are formed to enclose or support the rotating shaft 110' of the pump impeller 110 and the rotating shaft 121' of the driving turbine 121. As shown, the bearings 122a', 122a", 122b' may be installed at one end of the rotating shaft 110' of the pump impeller 110, and at two ends of the rotating shaft 121' of the driving turbine 121.

The steam supplying unit 130 and the steam collecting unit 140 are connected to the outlet header 13b of the steam generator 13. A bypass flow path 13' along which excess steam remaining after being supplied to the driving unit 120 is transferred to the main steam line 15, may be installed at the outlet header 13b of the steam generator 13. Then, all the steam generated from the steam generator 13 may be supplied to the driving unit 120. However, when the amount of steam supplied to the driving unit 120 is sufficient, part of the steam may be supplied to the driving unit 120, and another part thereof may be supplied to the main steam line 15 through the steam collecting unit 140. Only several percent (%) of steam generated from the steam generator 13 may be supplied to the reactor coolant pump.

As aforementioned with reference to FIGS. 1 and 2, in the reactor coolant pump 100 of the present invention, power required to rotate the pump impeller 110 is generated by using the driving turbine 121 without an electric motor in the reactor coolant system 10. And the power transmitting unit 122 may transfer a driving force generated from the driving turbine 121 to the pump impeller 110, without damaging a pressure boundary between a primary fluid and a secondary fluid.

A modification example of the reactor coolant pump 100, obtained by correcting a structure of the reactor coolant pump 100 according to a required characteristic of a nuclear power plant, will be explained with reference to FIGS. 3 and 4.

Figure 3:
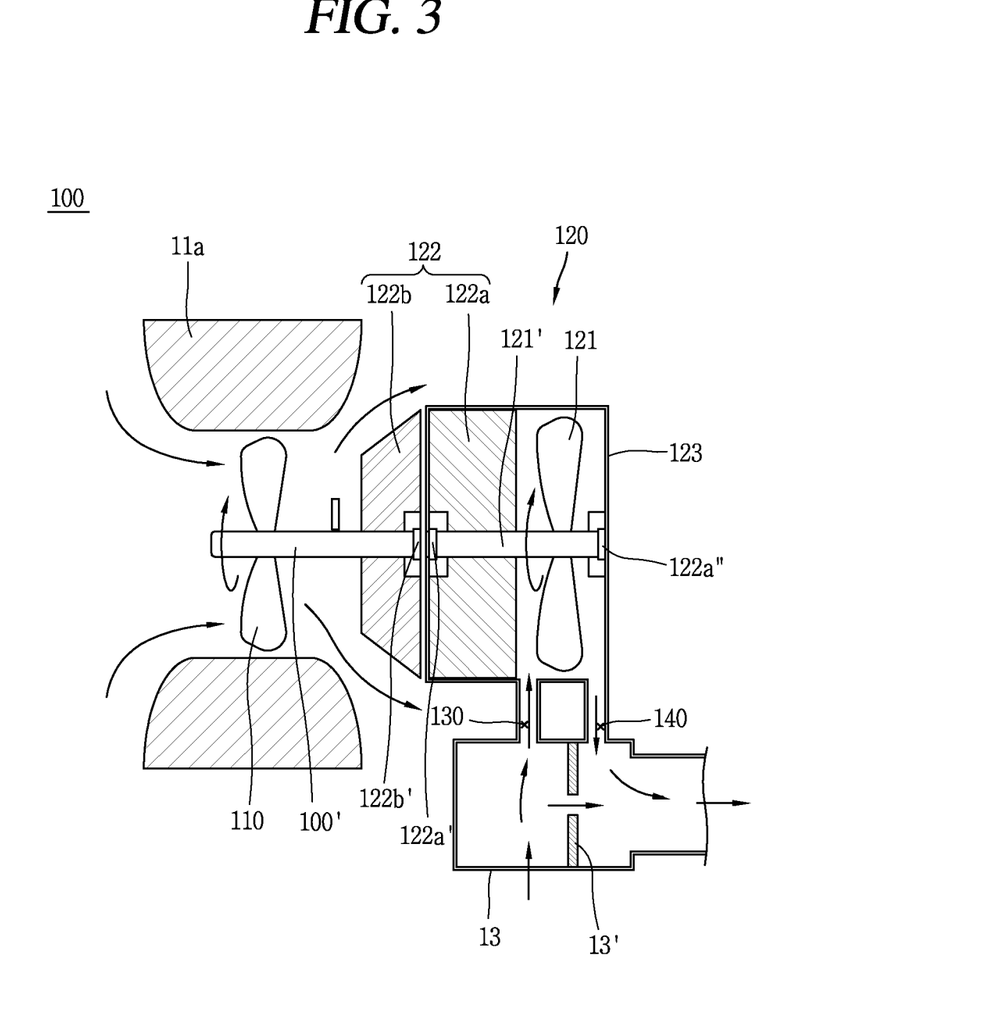
FIG. 3 is a conceptual view illustrating a modification example of the reactor coolant pump of FIG. 2.

FIG. 3 is a conceptual view illustrating a modification example of the reactor coolant pump 100 shown in FIG. 2.

In the reactor coolant pump 100, the rotating shaft of the pump impeller 110 and the rotating shaft of the driving motor are not necessarily formed in a vertical direction. As shown in FIG. 3, the rotating shaft 110' of the pump impeller 110 and the rotating shaft 121' of the driving electric motor may be corrected, such that a primary fluid may be set up to circulate to a required direction.

The pump impeller 110 and the driving turbine 121 may be formed to be rotated about the rotating shafts 110' and 121' extending in a horizontal direction, respectively. And the driving magnet portion 122a and the driven magnet portion 122b of the power transmitting unit 122 may be rotated about the rotating shaft 121' of the driving turbine 121 and the rotating shaft 110' of the pump impeller 110, respectively.

An installation direction of the flow path structure 11a is also changed according to a rotation direction of the pump impeller 110, thereby allowing a primary fluid to be introduced toward a direction of the rotating shaft 110' of the pump impellor 110.

The direction of the rotating shaft 110' of the pump impeller 110 and the rotating shaft 121' of the driving turbine 121 may be corrected according to a structure of a nuclear power plant and a required characteristic.

Figure 4:
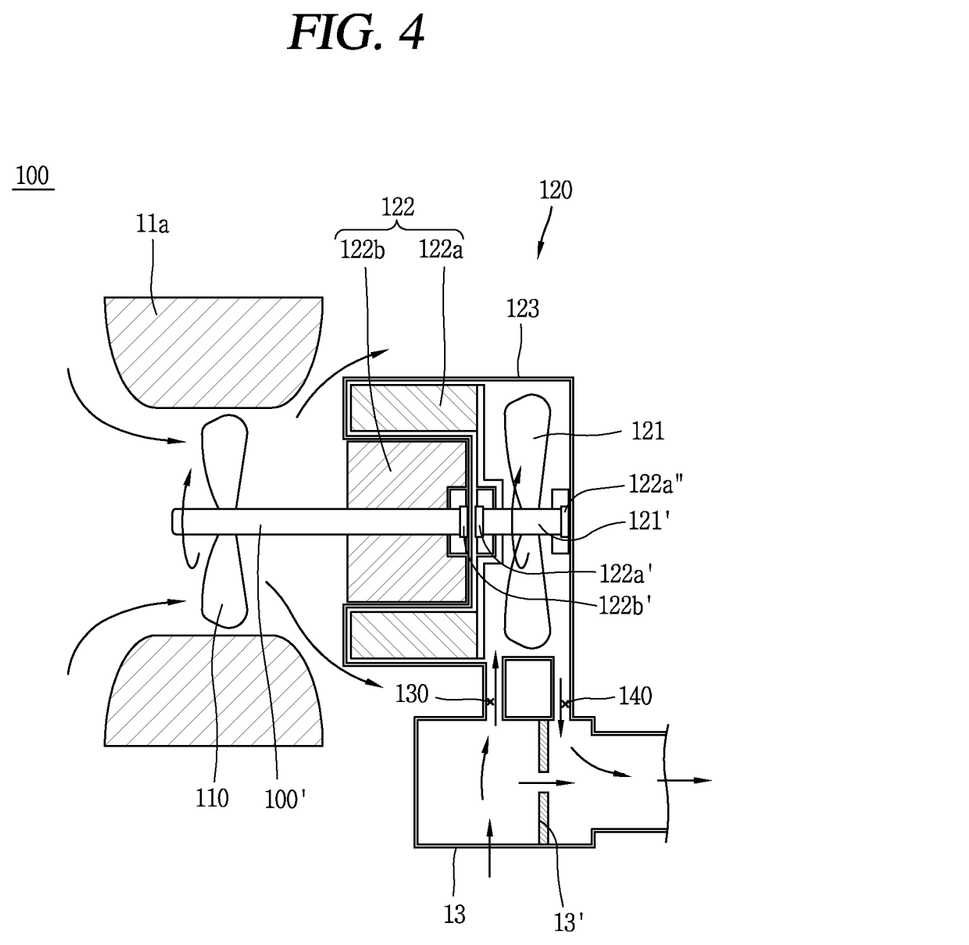
FIG. 4 is a conceptual view illustrating another modification example of the reactor coolant pump of FIG. 2.

FIG. 4 is a conceptual view illustrating another modification example of the reactor coolant pump 100 shown in FIG. 2.

The driving magnet portion 122a maintains a connected state to the rotating shaft 121' of the driving turbine 121, and is rotated together with the driving turbine 121. The driving magnet portion 122a is formed such that at least part thereof encloses an edge of the driven magnet portion 122b. Alternatively, the driven magnet portion 122b may be formed such that at least part thereof may enclose an edge of the driving magnet portion 122a. The casing 123 is formed to correspond to the driving magnet portion 122a, thereby enclosing the driving magnet portion 122a and the driving turbine 121.

Even in the reactor coolant pump 100 having the power transmitting unit 122, a pressure boundary between a primary fluid and a secondary fluid is maintained by the casing 123.

A distance between the driving magnet portion 122a and the driven magnet portion 122b may be variable according to a required design of a nuclear power plant. Generally, as the distance between the driving magnet portion 122a and the driven magnet portion 122b (a magnet coupling interval) becomes long, a shear magnetic force decreases. Thus, the distance between the driving magnet portion 122a and the driven magnet portion 122b is required to be controlled for prevention of significant reduction of the shear magnetic force.

Especially, in a case where the installation space of a structure in the reactor vessel 11 is strictly restricted like in an integral reactor, if the driving magnet portion 122a is formed such that at least part thereof encloses an edge of the driven magnet portion 122b, an installation space of the reactor coolant pump 100 may be reduced.

Hereinafter, an operation of the reactor coolant pump 100 and a nuclear power plant when the plant is in a normal operation and in an accident, will be explained with reference to FIGS. 5 and 6.

Figure 5:
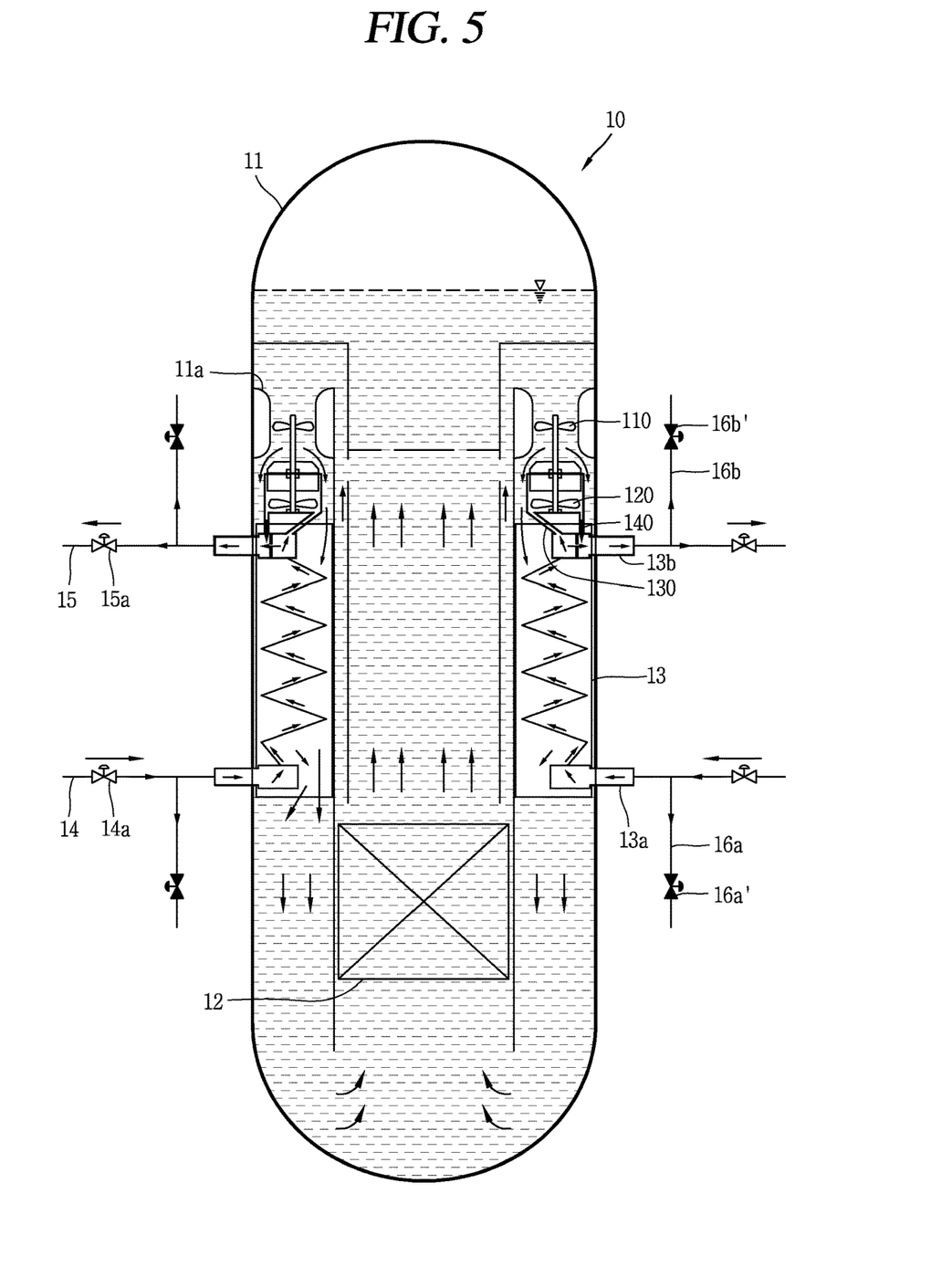
FIG. 5 is a conceptual view illustrating an operation of the reactor coolant pump of FIG. 1 and a nuclear power plant having the same when the nuclear power plant is in a normal operation.

FIG. 5 is a conceptual view illustrating an operation of the reactor coolant pump 100 shown in FIG. 1 and a nuclear power plant having the same when the nuclear power plant is in a normal operation.

When the nuclear power plant is in the normal operation, both an isolation valve 14a of the main feed water line 14 and an isolation valve 15a of the main steam line 15 are open. Feed water, a secondary fluid is supplied through the main feed water line 14, and the steam generator 13 transfers heat supplied from the reactor core 12 to the feed water to generate steam.

The steam generated from the steam generator 13 is discharged to the outlet header 13b, and at least part of the steam is supplied to the reactor coolant pump 100 through the steam supplying unit 130. The driving unit 120 converts a fluid force into a mechanical rotation force, thereby generating a driving force required to rotate the pump impeller 110. And the pump impeller 110 converts a mechanical rotation force into a fluid force by rotation, thereby circulating a primary fluid in the reactor coolant system 10.

Steam having passed through the driving unit 120, and steam having passed through the bypass flow path 13' from the outlet header 13b of the steam generator 13 are introduced into the main steam line 15, thereby being supplied to a turbine system (not shown).

During a normal operation of the nuclear power plant, steam is generated from the steam generator 13 by using feed water, and at least part of the generated steam is used to generate power required to drive the reactor coolant pump 100.

Figure 6:
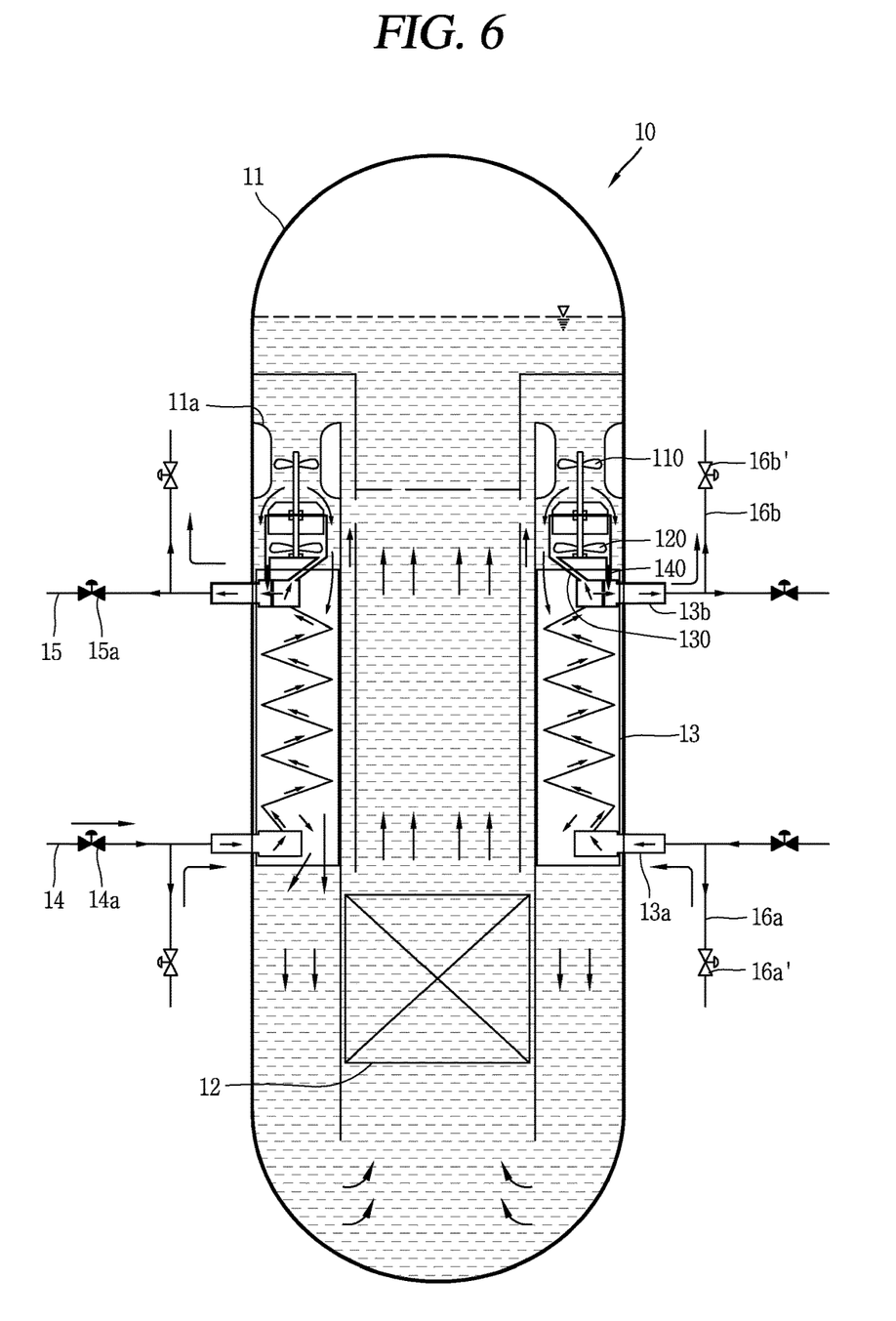
FIG. 6 is a conceptual view illustrating an operation of the reactor coolant pump of FIG. 1 and a nuclear power plant having the same when an accident occurs.

FIG. 6 is a conceptual view illustrating an operation of the reactor coolant pump 100 of FIG. 1 and a nuclear power plant having the same when an accident occurs.

When an accident occurs in the nuclear power plant, both the isolation valve 14a of the main feed water line 14 and the isolation valve 15a of the main steam line 15 are closed. And isolation valves 16a', 16b' installed at lines 16a, 16b connected to a safety system such as a passive residual heat removal system (not shown) or an auxiliary feed water system (not shown). As the main feed water line 14 and the main steam line 15 are closed, supply of feed water to the steam generator 13 is interrupted. However, as the isolation valves 16a', 16b' installed at the lines 16a, 16b connected to the safety system are open, feed water is supplied from the safety system to the steam generator 13.

Once the lines 16a, 16b connected to a passive residual heat removal system or a discharging line are open, coolant is supplied to the steam generator 13. Then, steam is discharged to the outside of the steam generator 13, as the coolant turns into steam by receiving sensible heat of the reactor coolant system 10 and residual heat of the reactor core 12. That is, the steam generator 13 generates steam using coolant supplied thereto, and the generated steam is discharged to the main steam line 15 through the outlet header 13b.

At least part of the steam is supplied to the reactor coolant pump 100 at the outlet header 13b of the steam generator 13, and the driving unit 120 generates a driving force required to rotate the pump impeller 110. The steam is re-collected to be discharged from the steam generator 13 toward the passive residual heat removal system or the discharging line.

As aforementioned, in the present invention, not only when a nuclear power plant is in the normal operation, but also when supply of feed water is interrupted due to an accident, steam may be generated by using coolant supplied from a safety system such as a passive residual heat removal system or an auxiliary feed water system. And a driving force required to rotate the pump impeller 110 may be generated by using the generated steam.

In the present invention, when an accident occurs in the nuclear power plant, the pump impeller 110 which was being rotated normally is not drastically stopped, but is continuously rotated until the steam generator cannot generate steam as the reactor coolant system reaches a low temperature. Then, the pump impeller 110 has its rotation speed reduced gradually, thereby continuously circulating a primary fluid in the reactor coolant system 10.

When an accident occurs in the nuclear power plant, the nuclear power plant is stopped. As a result, the amount of steam to be supplied to the driving unit 120 is smaller than that during a normal operation. However, when an accident occurs in the nuclear power plant, residual heat generated from a nuclear reactor is also significantly reduced and a temperature of the reactor coolant system reduces gradually, so it is possible to generate a sufficient amount of steam by the steam generator. Thus, in the present invention, the reactor coolant pump 100 may be operated such that the reactor core 12 of the nuclear reactor may be maintained in a safe state. Especially, since the nuclear reactor undergoes a drastic change of state at an early stage of an accident, it is important to obtain a sufficient circulation flow of the reactor coolant system for cooling the reactor core 12 at an early stage of an accident. In the reactor coolant pump 100 of the present invention, a sufficient amount of steam can be generated by the steam generator 13 at an early stage of an accident, by using heat from the reactor coolant system. Thus, it is very advantageous to obtain a circulation flow of the reactor coolant system at an early stage of an accident. This may allow an enhanced safety of the nuclear power plant.

Figure 7:
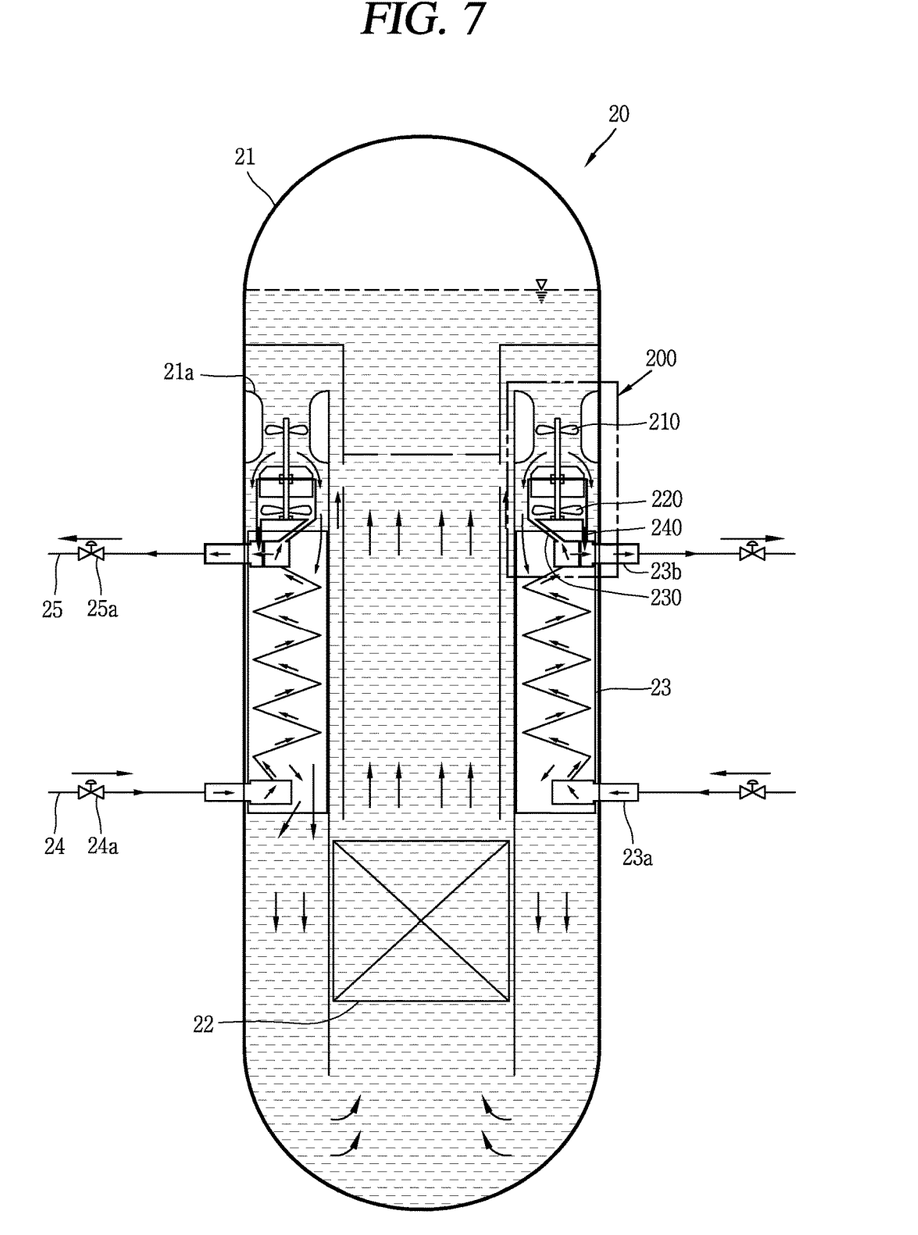
FIG. 7 is a conceptual view of a reactor coolant pump and a nuclear power plant having the same according to another embodiment of the present invention.

FIG. 7 is a conceptual view of a reactor coolant pump 200 and a nuclear power plant having the same according to another embodiment of the present invention.

The reactor coolant pump 200 and the nuclear power plant having the same shown in FIG. 7 have a similar structure to the reactor coolant pump 100 and the nuclear power plant having the same shown in FIG. 1. However, the reactor coolant pump 200 shown in FIG. 7 discloses a power transmitting unit 220 (refer to FIG. 8) having a different power transmitting mechanism from that of FIG. 1. A detailed structure of the power transmitting unit 220 will be explained with reference to FIG. 8.

Figure 8:
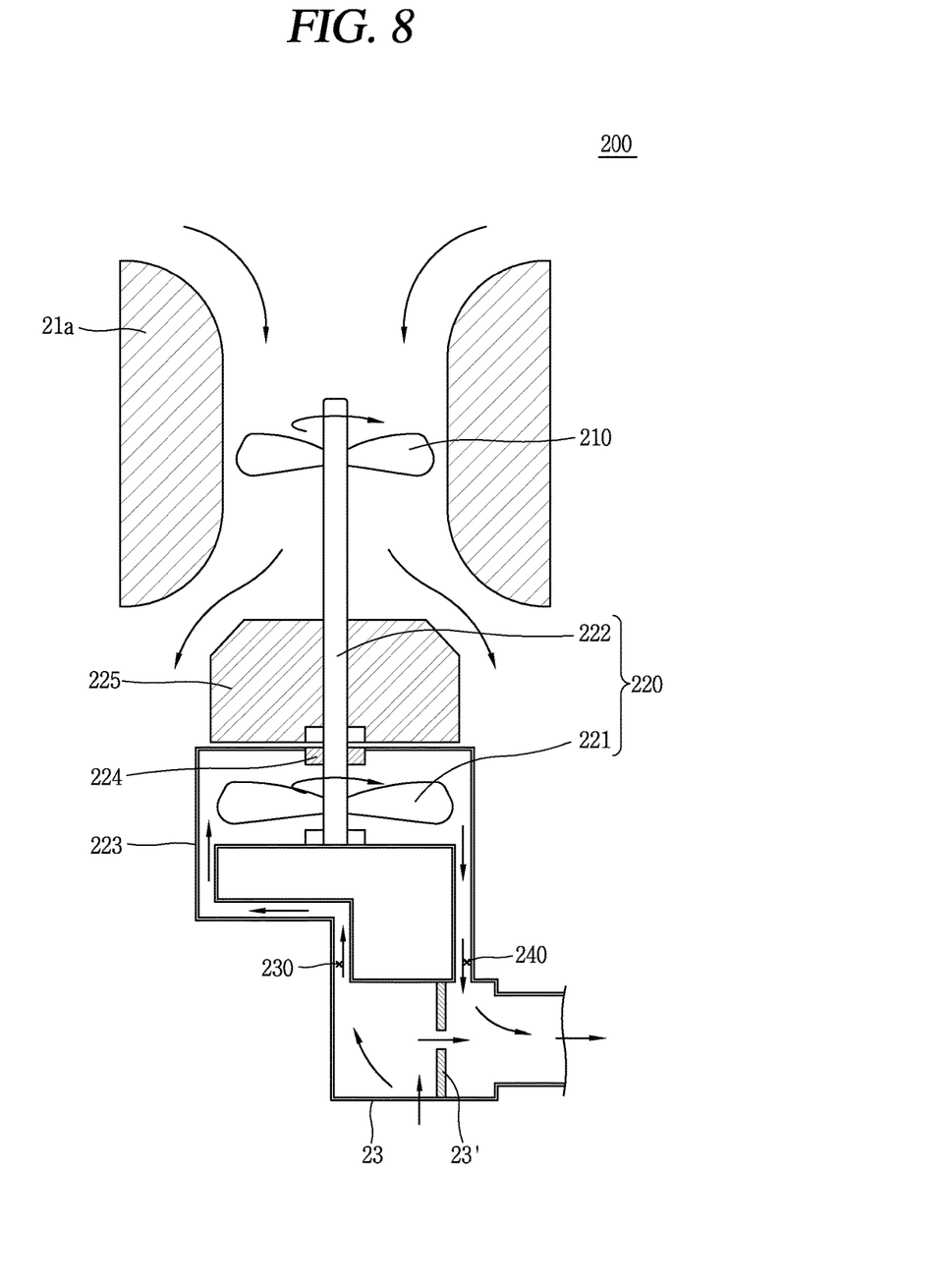
FIG. 8 is an enlarged view of the reactor coolant pump of FIG. 7.

FIG. 8 is an enlarged view of the reactor coolant pump 200 of FIG. 7.

The power transmitting unit 220 of the reactor coolant pump 200 adopts a mechanism to seal a pump shaft 222 by a mechanical sealing device 224, among mechanisms to transmit a mechanical rotation force to a pump impeller 210.

The power transmitting unit 220 includes the pump shaft 222 connected to each of the pump impeller 210 and a driving turbine 221 by passing through a casing 223, so as to form a rotating shaft of the pump impeller 210 and the driving turbine 221. Once the driving turbine 221 is rotated by steam supplied from a steam supplying unit 230, the pump impeller 210 connected to the driving turbine 221 by the pump shaft 222 is also rotated. And the pump impeller 210 circulates a primary fluid in the reactor coolant system 20 (refer to FIG. 7).

Unlike in the drawings, the pump shaft 222 may be implemented as a plurality of pump shafts 222, not a single component. For instance, if the pump shaft 222 is composed of a first pump shaft and a second pump shaft, the first pump shaft may be connected to one of the pump impeller 210 and the driving turbine 221, and at least part of the first pump shaft may pass through the casing 223. The second pump shaft may be connected to another one of the pump impeller 210 and the driving turbine 221, and may be connected to the first pump shaft so as to be rotated together with the first pump shaft. The first pump shaft and the second pump shaft may be rotated by being engaged with each other by gears.

The power transmitting unit 222 further includes a sealing device 224 configured to prevent leakage of a primary fluid and a secondary fluid. And the sealing device 224 is installed at a region where the pump shaft 222 passes through the casing 223, thereby enclosing the pump shaft 222. Thus, a pressure boundary between a primary fluid and a secondary fluid is maintained by the casing 223 and the sealing device 224.

Unlike in the drawings, the rotating shaft of the driving turbine 221 and the rotating shaft of the pump impeller 210 installed outside the casing 223, may be formed as separated pump shafts not the integrated pump shaft, according to a characteristic of the sealing device 224.

A flywheel 225 is installed at the pump shaft 222 in order to relieve a drastic performance change of the reactor coolant pump 200 due to a drastic change of the circumstance of the driving turbine 221 or the pump impeller 210, and in order to provide a circulation flow to the reactor coolant system for a predetermined time when a nuclear reactor is stopped. The flywheel 225 may not be installed according to a required characteristic of a nuclear power plant. In case of installing the flywheel 225 at the pump shaft 222 as shown, the pump impeller 210, the driving turbine 221 and the flywheel 225 use the pump shaft 222 as the same rotating shaft (integrated rotating shaft).

Hereinafter, a modification example of the reactor coolant pump 200, modified according to a required characteristic of a nuclear power plant will be explained with reference to FIG. 9.

Figure 9:
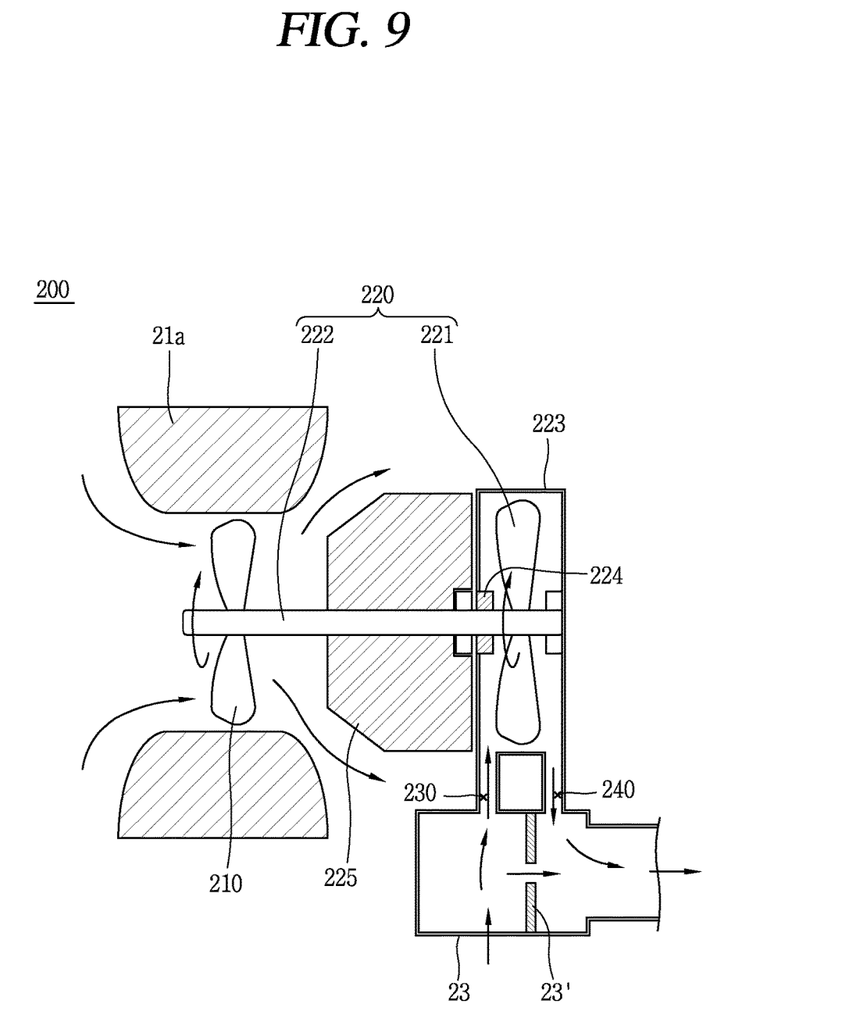
FIG. 9 is a conceptual view illustrating a modification example of the reactor coolant pump of FIG. 8.

FIG. 9 is a conceptual view illustrating a modification example of the reactor coolant pump 200 of FIG. 8.

In the reactor coolant pump 200, the rotating shaft of the pump impeller 210 and the rotating shaft of the driving motor are not necessarily formed in a vertical direction. As shown in FIG. 9, the rotating shaft of the pump impeller 210 and the rotating shaft of the driving electric motor may be corrected in direction, such that a primary fluid may be circulated to a required direction.

The pump shaft 222 may extend in a horizontal direction. And the pump impeller 210 may be installed at the pump shaft 222 outside the casing 223, and the driving turbine 221 may be installed at the pump shaft 222 inside the casing 223, thereby being rotated about the pump shaft 222 which is in a horizontal direction. The extending direction of the pump shaft 222 may be corrected according to a structure and a required characteristic of a nuclear power plant.

An installation direction of a flow path structure 21a is also changed according to a rotation direction of the pump impeller 210, such that a primary fluid is introduced to a direction of the pump shaft 222.

Hereinafter, still another embodiment of the present invention will be explained.

Figure 10:
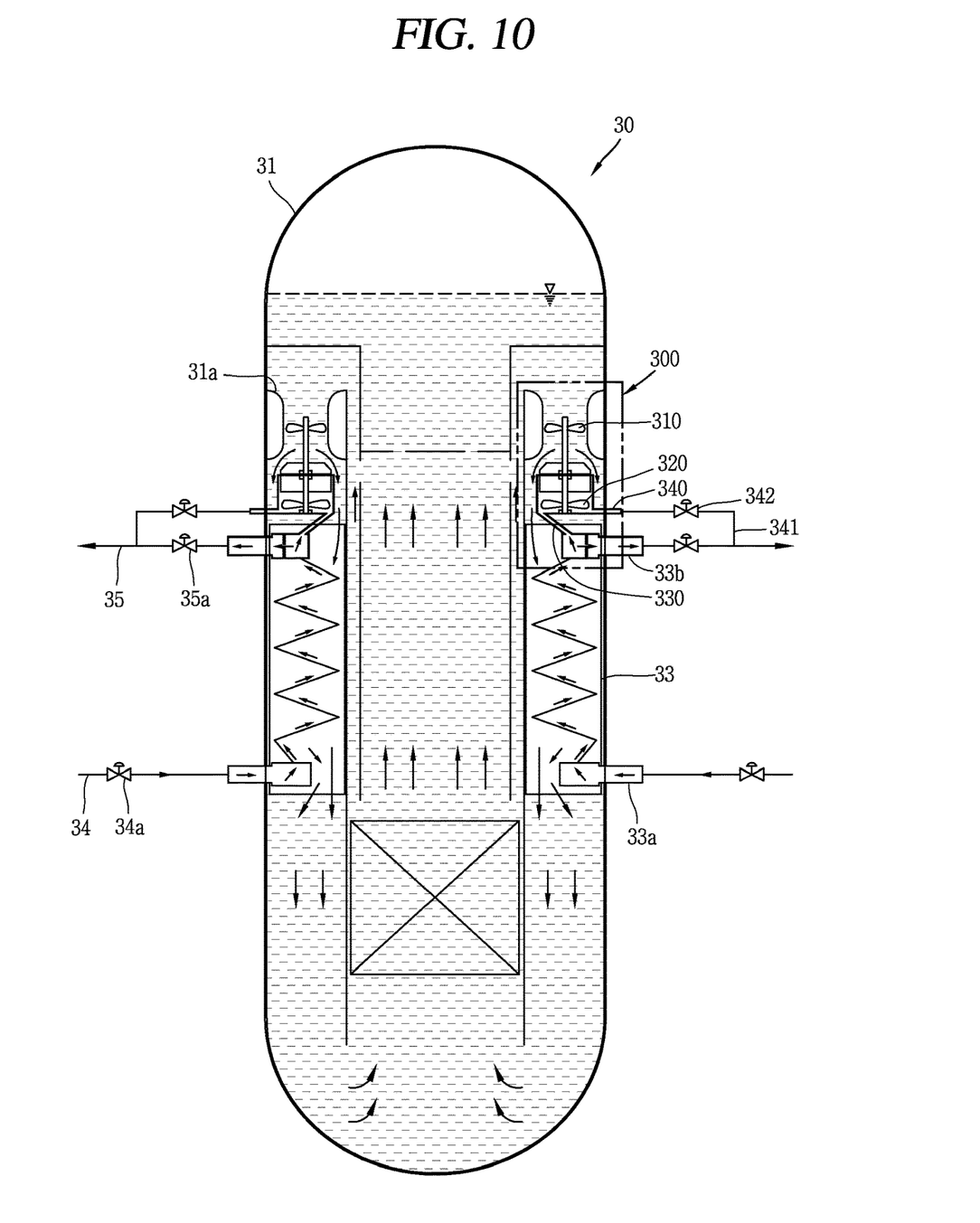
FIG. 10 is a conceptual view of a reactor coolant pump and a nuclear power plant having the same according to still another embodiment of the present invention.

FIG. 10 is a conceptual view of a reactor coolant pump 300 and a nuclear power plant having the same according to still another embodiment of the present invention.

A steam collecting unit 340 extends to the outside of a reactor coolant system 30 by passing through the reactor coolant system 30. As shown, the steam collecting unit 340 may pass through an outer wall of a reactor vessel 31.

A steam collecting line 341 connects the steam collecting unit 340 with a main steam line 35, such that steam is introduced into the main steam line 35 from the steam collecting unit 140. A flow control valve 342, configured to control a flow of steam which passes through a driving unit 320, is installed at the steam collecting line 341.

In a case where the reactor coolant pump 300 is applied to an integral reactor, an outlet header 33b of a steam generator 33 which passes through the reactor coolant system 30 may be connected to the main steam line 35 or the steam collecting line 341 by a nozzle and coupling equipment installed at a reactor vessel 31.

A bypass flow control valve 35a, configured to control a flow of excess steam which passes through the bypass flow path 13' (refer to FIG. 2), may be installed at the main steam line 35. The amount of steam supplied to the reactor coolant pump 300 and the main steam line 35 from the steam generator 33 may be determined respectively, by a cooperating opening/closing operation of the bypass flow control valve 35a and the flow control valve 342.

The reactor coolant pump and the nuclear power plant having the same are not limited to the structure and the method of the aforementioned embodiments. Each of the above embodiments may be selectively combined partially or wholly for various modifications.

INDUSTRIAL APPLICABILITY

The present invention may be used to enhance performance and safety of a reactor coolant pump in an industrial field of a nuclear power plant.

The invention claimed is:

1. A system comprising:
a steam generator and a reactor coolant pump, both located in a nuclear reactor vessel, the reactor coolant pump comprising:
a pump impeller installed at a primary fluid flow path of a reactor coolant system, the pump impeller comprising a rotating shaft and configured to rotate in order to circulate the primary fluid in the reactor coolant system;
a driving unit configured to rotate along a same axis as the rotating shaft of the pump impeller by receiving steam of a secondary fluid from a steam generator to generate a driving force for rotating the pump impeller, and configured to transmit the generated driving force to the pump impeller; and
a steam supplying unit configured to form a flow path between the steam generator and the driving unit, to supply at least part of steam discharged from the steam generator to the driving unit,
wherein the driving unit includes a driving turbine rotated along the same axis as the rotating shaft of the pump impeller by receiving steam from the steam supplying unit to convert a fluid force of steam into a mechanical rotation force,
a casing formed to enclose the driving turbine, such that the primary fluid which circulates in the reactor coolant system is isolated from the secondary fluid which passes through the steam generator; and a steam collecting unit configured to form a flow path communicated with the casing and connected to a main steam line, to collect steam having passed through the driving unit and to supply the collected steam to a turbine system through the main steam line, wherein the pump impeller, the driving unit and the steam supplying unit are all located in the reactor vessel and above the steam generator.

2. The system of claim 1, wherein the driving unit includes:

a power transmitting unit located between the driving turbine and the pump impeller, and configured to transmit the mechanical rotation force formed by the driving turbine to the pump impeller.

3. The system of claim 2, wherein the power transmitting unit includes:

a driving magnet portion connected to a rotating shaft of the driving turbine, to be rotated together with the driving turbine in the casing when the driving turbine is rotated; and a driven magnet portion installed outside the casing to face the driving magnet portion, connected to the rotating shaft of the pump impeller, coupled with the driving magnet portion by a magnetic force in order to transfer the mechanical rotation force formed by the driving turbine to the pump impeller, and rotated together with the driving magnet portion when the driving magnet portion is rotated.

4. The system of claim 3, wherein the driving magnet portion is formed to enclose the driven magnet portion; or the driven magnet portion is formed to enclose the driving magnet portion.

5. The system of claim 2, wherein the power transmitting unit includes a pump shaft connected to the pump impeller and the driving turbine as the pump shaft passes through the casing, to form the rotating shaft of the pump impeller and the rotating shaft of the driving turbine.

6. The system of claim 5, wherein the pump shaft includes:

a first pump shaft having a portion passing through the casing; and a second pump shaft connected to the first pump shaft to be rotated together with the first pump shaft, wherein the first pump shaft is connected to the pump impeller and the second pump shaft is connected to the driving turbine, or the first pump shaft is connected to the driving turbine and the second pump shaft is connected to the pump impeller.

7. The system of claim 5, wherein the power transmitting unit further includes a sealing device configured to prevent leakage of the primary fluid or the secondary fluid, and located at a region where the pump shaft passes through the casing.

8. The system of claim 5, further comprising a flywheel located at the pump shaft in order to relieve a drastic performance change of the driving turbine or the pump impeller, and in order to provide a circulation flow to the reactor coolant system when a nuclear reactor is stopped.

9. The system of claim 1, wherein the steam supplying unit and the steam collecting unit are connected to a header of the steam generator, and wherein a bypass flow path along which excess steam remaining after being supplied to the driving unit is transferred to the main steam line, is located at the header of the steam generator.

10. The system of claim 1, wherein the steam collecting unit extends to the outside of the reactor coolant system by passing through the reactor coolant system, and wherein the reactor coolant pump further comprises:

a steam collecting line configured to connect the steam collecting unit with the main steam line, such that steam is introduced into the main steam line from the steam collecting unit; and a flow control valve installed at the steam collecting line, and configured to control a flow of steam which passes through the driving unit.

11. The system of claim 9, further comprising a bypass flow control valve installed at the main steam line, and configured to control a flow of the excess steam which passes through the bypass flow path.

12. A nuclear power plant, comprising:

a steam generator located in a reactor vessel and configured to generate steam by transferring heat supplied from a reactor core, to a secondary fluid introduced through a feed water line; and a reactor coolant pump configured to circulate a primary fluid inside a reactor coolant system, using a driving force generated by using at least part of the steam generated by the steam generator, wherein the reactor coolant pump includes:

a pump impeller installed at a primary fluid flow path of the reactor coolant system, the pump impeller comprising a rotating shaft and configured to rotate in order to circulate the primary fluid in the reactor coolant system;

a driving unit configured to rotate along a same axis as the rotating shaft of the pump impeller by receiving steam of a secondary fluid from the steam generator to generate a driving force for rotating the pump impeller, and configured to transmit the generated driving force to the pump impeller; and a steam supplying unit configured to form a flow path between the steam generator and the driving unit, to supply at least part of steam discharged from the steam generator to the driving unit, wherein the driving unit includes a driving turbine rotated along the same axis as the rotating shaft of the pump impeller by receiving steam from the steam supplying unit to convert a fluid force of steam into a mechanical rotation force, a casing formed to enclose the driving turbine, such that the primary fluid which circulates in the reactor coolant system is isolated from the secondary fluid which passes through the steam generator; and a steam collecting unit configured to form a flow path communicated with the casing and connected to a main steam line, to collect steam having passed through the driving unit and to supply the collected steam to a turbine system through the main steam line, wherein the pump impeller, the driving unit and the steam supplying unit are all located in the reactor vessel and above the steam generator.

* * * * *